United States Patent
Khosla et al.

(10) Patent No.: US 11,150,670 B2
(45) Date of Patent: Oct. 19, 2021

(54) AUTONOMOUS BEHAVIOR GENERATION FOR AIRCRAFT

(71) Applicant: The Boeing Company, Chicago, IL (US)

(72) Inventors: Deepak Khosla, Camarillo, CA (US); Kevin R. Martin, Oak Park, CA (US); Sean Soleyman, Calabasas, CA (US); Ignacio M. Soriano, University City, MO (US); Michael A. Warren, Northridge, CA (US); Joshua G. Fadaie, Saint Louis, MO (US); Charles Tullock, Saint Peters, MO (US); Yang Chen, Westlake Village, CA (US); Shawn Moffit, Glen Carbon, IL (US); Calvin Chung, Saint Louis, MO (US)

(73) Assignee: The Boeing Company, Chicago, IL (US)

( * ) Notice: Subject to any disclaimer, the term of this patent is extended or adjusted under 35 U.S.C. 154(b) by 323 days.

(21) Appl. No.: 16/423,892

(22) Filed: May 28, 2019

(65) Prior Publication Data
US 2020/0379486 A1 Dec. 3, 2020

(51) Int. Cl.
*G05D 1/10* (2006.01)
*G05D 1/00* (2006.01)
*G05B 13/02* (2006.01)

(52) U.S. Cl.
CPC ......... *G05D 1/101* (2013.01); *G05B 13/0265* (2013.01); *G05D 1/0088* (2013.01)

(58) Field of Classification Search
CPC .................................................... G05D 1/101
See application file for complete search history.

(56) References Cited

U.S. PATENT DOCUMENTS 8,924,069 B1 * 12/2014 Kaneshige .............. F41G 9/002
701/27
9,679,258 B2 6/2017 Mnih et al.
(Continued)

OTHER PUBLICATIONS

C. Clark, "Artificial Intelligence Drone Defeats Fighter Pilot: The Future?", Aug. 8, 2016, Breaking Defense, available via the Internet at breakingdefense.com/2016/08/artificial-intelligence-drone-defeats-fighter-pilot-the-future (last visited Apr. 24, 2019).
(Continued)

*Primary Examiner* — Alex C Dunn
(74) *Attorney, Agent, or Firm* — McDonnell Boehnen Hulbert & Berghoff LLP

(57) ABSTRACT

Apparatus and methods for training a machine learning algorithm (MLA) to control a first aircraft in an environment that comprises the first aircraft and a second aircraft are described. Training of the MLA can include: the MLA determining a first-aircraft action for the first aircraft to take within the environment; sending the first-aircraft action from the MLA; after sending the first-aircraft action, receiving an observation of the environment and a reward signal at the MLA, the observation including information about the environment after the first aircraft has taken the first-aircraft action and the second aircraft has taken a second-aircraft action, the reward signal indicating a score of performance of the first-aircraft action based on dynamic and kinematic properties of the second aircraft; and updating the MLA based on the observation of the environment and the reward signal.

20 Claims, 6 Drawing Sheets

(56) References Cited

U.S. PATENT DOCUMENTS

| | | | |
|---|---|---|---|
| 10,908,277 B1* | 2/2021 | Roggendorf | G01W 1/08 |
| 10,935,938 B1* | 3/2021 | Bertram | G05B 13/0265 |
| 2019/0113920 A1* | 4/2019 | England | G05D 1/0257 |
| 2020/0379486 A1* | 12/2020 | Khosla | G05D 1/0088 |

OTHER PUBLICATIONS

N. Ernest et al., "Genetic Fuzzy based Artificial Intelligence for Unmanned Combat Aerial Vehicle Control in Simulated Air Combat Missions", Mar. 2016, Journal of Defense Management, vol. 6, Issue 1.

V. Konda et al., "Actor-Critic Algorithms", Nov. 29, 1999, Proceedings of Advances in Neural Information Processing Systems (NIPS) 12, available via the Internet at https://papers.nips.cc/paper/1786-actor-critic-algorithms (last visited May 11, 2019).

S. Levine, "Actor-Critic Algorithms", Sep. 11, 2017, available via the Internet at rail.eecs.berkeley.edu/deeprlcourse-fa17/f17docs/lecture_5_actor_critic_pdf.pdf (last visited Apr. 24, 2019).

P. Liu et al., "A Deep Reinforcement Learning Based Intelligent Decision Method for UCAV Air Combat", Aug. 27, 2017, Proceedings of AsiaSim 2017, Part I.

J. McGrew et al., "Air Combat Strategy using Approximate Dynamic Programming", Sep. 2010, Journal of Guidance, Control, and and Dynamics, vol. 33, Iss. 5.

V. Mnih et al., "Asynchronous Methods for Deep Reinforcement Learning", Feb. 4, 2016, available via the Internet at arxiv.org/pdf/1602.01783 (last visited Apr. 24, 2019).

K. Osborn, "Artificial intelligence will allow tighter jet pilots to control drones", Oct. 25, 2016, available via the Internet at defensesystems.com/articles/2016/10/25/f35.aspx (last visited Apr. 24, 2019).

T. Simonini, "An intro to Advantage Actor Critic methods: let's play Sonic the Hedgehog!", Jul. 25, 2018, available via the Internet at medium.freecodecamp.org/an-intro-to-advantage-actor-critic-methods-lets-play-sonic-the-hedgehog-86d6240171d (last visited Apr. 24, 2019).

D. Smith, "The Pilot's Associate Program", Jul. 21, 2004, available via the Internet at ww.dms489.com/PA/PA_index.html (last visited Apr. 24, 2019).

A. Toubman et al., "Dynamic Scripting with Team Coordination in Air Combat Simulation", Jun. 3, 2014, Proceedings of the 27th International Conference on Industrial, Engineering & Other Applications of Applied Intelligent Systems.

R. Williams, "Simple Statistical Gradient-Following Algorithms for Connectionist Reinforcement Learning", May 1992, Machine Learning, vol. 8, Issue 3-4, pp. 229-256, available via the Internet at www-anw.cs.umass.edu/~barto/courses/cs687/williams92simple.pdf (last visited Apr. 24, 2019).

* cited by examiner

800

810 Train a machine learning algorithm to control a first aircraft in an environment that comprises the first aircraft and a second aircraft:
- Determine an action for the first aircraft to take within the environment using the machine learning algorithm;
- Send the action from the machine learning algorithm;
- After sending the first-aircraft action, receive an observation of the environment and a reward signal at the machine learning algorithm, where the observation of the environment comprises information about the environment after the first aircraft has taken the first-aircraft action and the second aircraft has taken a second-aircraft action, and wherein the reward signal indicates a score of performance of the first-aircraft action by the first aircraft based on one or more dynamic and kinematic properties of the second aircraft within the environment; and
- Update the machine learning algorithm based on the observation of the environment and the reward signal.

FIG. 8

AUTONOMOUS BEHAVIOR GENERATION FOR AIRCRAFT

FIELD

The present disclosure generally relates to air engagement, and more particularly to methods and apparatus related to training and utilizing a machine learning algorithm to control a first aircraft in an environment that includes the first aircraft and a second aircraft.

BACKGROUND

Aircraft can be controlled by humans and by autonomous control systems. In adversarial and cooperative scenarios involving two aircraft, both aircraft are often controlled by human pilots. Such scenarios involve flexible reactions to events occurring in the environment, including events caused by the other aircraft and environmental events, such as changes in weather, terrain, or other conditions. Autonomously flown aircraft are frequently utilized in single aircraft scenarios, such as a ground surveillance scenario. Some autonomous control systems can be used in two-aircraft scenarios—such autonomous control systems typically include rule-based systems that use rules of the system to perform pre-programmed behaviors in these scenarios.

SUMMARY

In one example, a method is described. A machine learning algorithm is trained to control a first aircraft in an environment that includes the first aircraft and a second aircraft. The machine learning algorithm is trained by: determining a first-aircraft action for the first aircraft to take within the environment using the machine learning algorithm; sending the first-aircraft action from the machine learning algorithm; after sending the first-aircraft action, receiving an observation of the environment and a reward signal at the machine learning algorithm, where the observation of the environment includes information about the environment after the first aircraft has taken the first-aircraft action and the second aircraft has taken a second-aircraft action, and where the reward signal indicates a score of performance of the first-aircraft action by the first aircraft based on one or more dynamic and kinematic properties of the second aircraft within the environment; and updating the machine learning algorithm based on the observation of the environment and the reward signal.

In another example, a computing device is described. The computing device includes one or more processors and data storage storing at least executable instructions that, when executed by the one or more processors, causes the computing device to perform functions. The functions include: training a machine learning algorithm to control a first aircraft in an environment that includes the first aircraft and a second aircraft by: determining a first-aircraft action for the first aircraft to take within the environment using the machine learning algorithm; sending the first-aircraft action from the machine learning algorithm; after sending the first-aircraft action, receiving an observation of the environment and a reward signal at the machine learning algorithm, where the observation of the environment includes information about the environment after the first aircraft has taken the first-aircraft action and the second aircraft has taken a second-aircraft action, and where the reward signal indicates a score of performance of the first-aircraft action by the first aircraft based on one or more dynamic and kinematic properties of the second aircraft within the environment; and updating the machine learning algorithm based on the observation of the environment and the reward signal.

In another example, a non-transitory computer readable medium is described. The non-transitory computer readable medium has stored thereon computer-readable instructions, that when executed by one or more processors of a computing device, cause the computing device to perform functions. The functions include: training a machine learning algorithm to control a first aircraft in an environment that includes the first aircraft and a second aircraft by: determining a first-aircraft action for the first aircraft to take within the environment using the machine learning algorithm; sending the first-aircraft action from the machine learning algorithm; after sending the first-aircraft action, receiving an observation of the environment and a reward signal at the machine learning algorithm, where the observation of the environment includes information about the environment after the first aircraft has taken the first-aircraft action and the second aircraft has taken a second-aircraft action, and where the reward signal indicates a score of performance of the first-aircraft action by the first aircraft based on one or more dynamic and kinematic properties of the second aircraft within the environment; and updating the machine learning algorithm based on the observation of the environment and the reward signal.

The features, functions, and advantages that have been discussed can be achieved independently in various embodiments or may be combined in yet other embodiments further details of which can be seen with reference to the following description and drawings.

BRIEF DESCRIPTION OF THE FIGURES

FIG. 8 is a flowchart of a method related to training a machine learning algorithm to control an aircraft, according to example embodiments.

DETAILED DESCRIPTION

Figure 1:
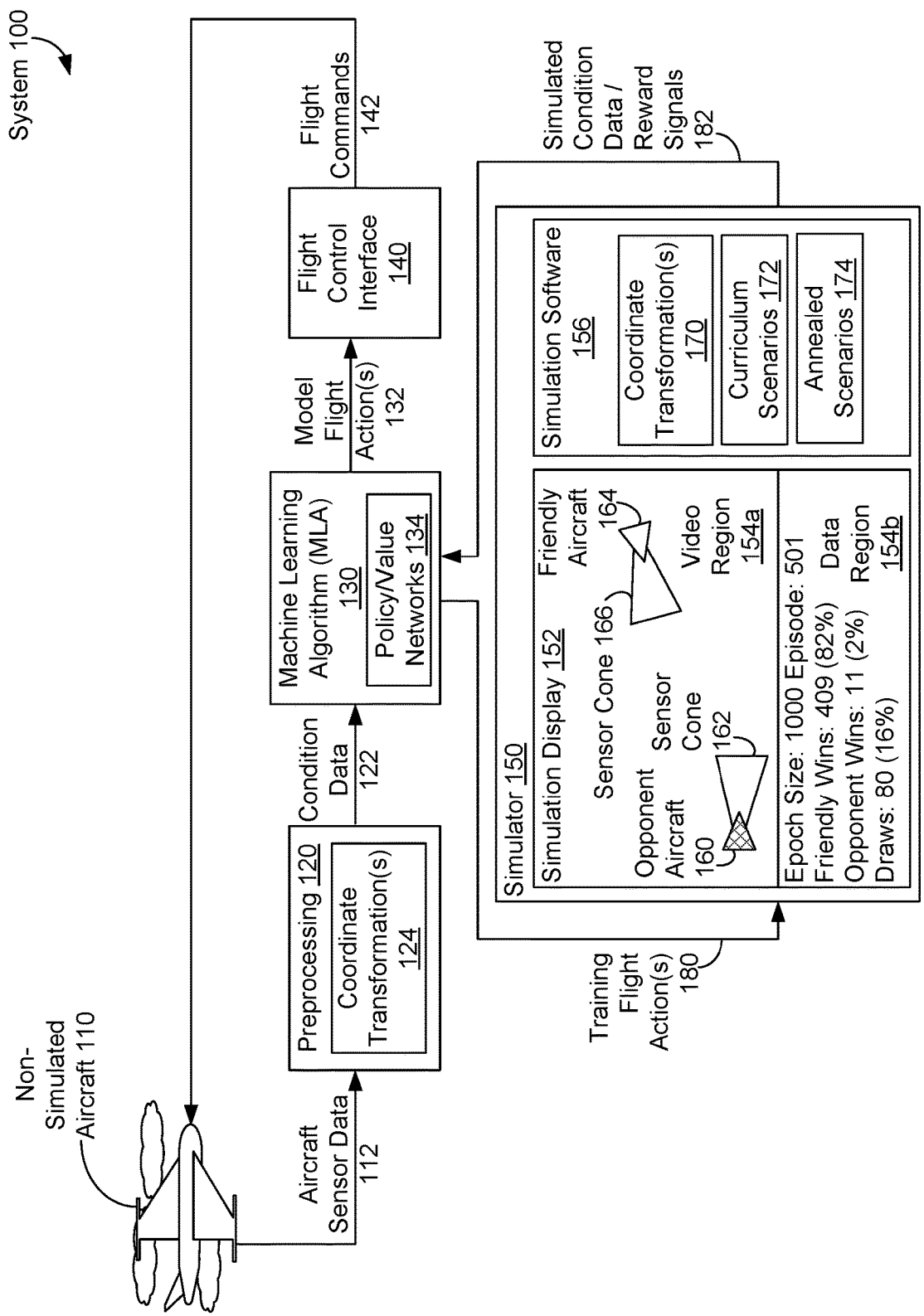
FIG. 1 is a block diagram of a system, according to example embodiments.

Herein are described techniques for utilizing machine learning in autonomous vehicle control, such as controlling one or both aircraft in two-aircraft scenarios. In some examples, the aircraft can be controlled in adversarial engagement scenarios such as air-air combat between two aircraft. In some examples, the aircraft can be controlled in non-adversarial scenarios, such as in-air refueling of a first aircraft by a second aircraft or coordinated flight between two aircraft. In simulations, the herein-described machine learning algorithm has learned to control an aircraft to pursue and engage an opponent aircraft in adversarial two-aircraft scenarios.

A machine learning algorithm, such as but not limited to an algorithm using one or more artificial neural networks (ANNs), can select actions for one or both aircraft involved in a two-aircraft scenario. In some examples, the machine learning algorithm can use other techniques than ANNs; e.g., a model that is a linear function of learnable parameters. Such a linear model could use learnable parameters constructed from one or more polynomials, one or more linear combinations of Fourier basis functions, one or more linear combinations of radial basis functions coarse coding, tile coding, or any other feature extraction scheme.

During training, and perhaps at other times, the machine learning algorithm can operate with a computer-simulated environment that provides environmental inputs (e.g., location data, heading data, airspeed data) based on actions taken by the aircraft in the scenario. In some examples, the machine learning algorithm can be trained using the computer-simulated environment and/or data collected from sensors on an actual aircraft. In some examples, the machine learning algorithm can be trained with scenarios with random initial data (e.g., aircraft starting positions, aircraft weights, wind speed, maximum aircraft speed, starting orientations of aircraft, starting speeds of aircraft). The use of random initial data can enable the machine learning algorithm (e.g., the policy network) to generalize to previously un-seen scenarios.

A reinforcement learning algorithm can be used to train the machine learning algorithm, such as but not limited to, training one or more ANNs. The machine learning algorithm can have a policy ANN, or policy network for short, that acts as an agent to select actions to control an aircraft conducive to a successful two-aircraft scenario outcome, where the action is selected based on a current state of an environment for the two-aircraft scenario. Then, after the agent selects an action using the policy network, the action can be provided to the aircraft and the aircraft can carry out the action. In response to the aircraft carrying out the action, a reward signal that indicates a score of performance of the aircraft can be generated by the environment and provided to the agent. The machine learning algorithm can also have a value ANN, or value network for short, that can generate value estimates that evaluate the actions of the policy network.

The reinforcement learning algorithm can use value estimates provided by the value network to train the policy network. A value estimate VE for an action A can estimate a future reward R that will be obtained after taking action A in an environment E, where the future reward R can be a reward that is expected to accumulate over the future. Then, the reinforcement learning algorithm can take a difference between the value estimate provided by the value network and a discounted cumulative reward for the agent, and use that difference in a loss function, where the result of the loss function can be used to update weights of the ANNs of the machine learning algorithm.

In some examples, the machine learning algorithm can be trained using curriculum learning techniques. As curriculum learning begins, the machine learning algorithm starts training with simplified or low-difficulty scenarios. Then, as curriculum learning proceeds, the machine learning algorithm is trained on progressively more challenging or higher-difficulty scenarios.

Employment of the computer-simulated environment can be useful for training of flight personnel and for simulation of military scenarios. After training, the trained machine learning algorithm can control an actual aircraft by receiving sensor data of sensors of the actual aircraft and generate control signals for the actual aircraft's actuators, thereby controlling the actual aircraft. In some examples, the machine learning algorithm can be used as a component in a flight simulator and/or in an unmanned aircraft to generate behaviors for non-human-controlled platforms.

The herein-described techniques can be utilized on an aircraft (possibly unmanned) to automatically control the aircraft during adversarial and/or cooperative scenarios, thereby removing the necessity of having a human pilot. The herein-described techniques can be utilized as part of a pilot training simulator; e.g., to play the role of an opponent aircraft in an adversarial scenario. The herein-described techniques are more flexible than rule-based systems that are limited to pre-programmed behaviors. In contrast, the herein-described techniques include techniques for learning strategies and tactics by interacting with simulation software and/or actual aircraft. Consequently, it is possible and desirable for herein-described machine learning algorithms to learn and carry out completely novel strategies and tactics, with the potential to improve upon current best-practice strategies and tactics. Additionally, the herein-described machine learning algorithms can be trained and tuned with relatively-small amounts of human effort; e.g., by use of automated aircraft simulators and by automated learning techniques, such as reinforcement learning.

FIG. 1 is a block diagram of a system 100, according to example embodiments. System 100 can include non-simulated (or actual) aircraft 110, preprocessing 120, machine learning algorithm (MLA) 130, flight control interface 140, and simulator 150. Non-simulated aircraft 110 can be termed an actual aircraft configured to fly in an environment. Non-simulated aircraft 110 can include sensors that provide aircraft sensor data 112 about the environment for use in controlling non-simulated aircraft 110 and perhaps other reasons. Aircraft sensor data can include data about non-simulated aircraft 110, such as, but not limited to, elevation data, airspeed data, ground speed data, position data, velocity data, acceleration data, heading data, meteorological data (e.g., wind-related data, precipitation-related data, barometric pressure data, visibility data), and/or data about other aircraft in the environment of non-simulated aircraft 110 For example, FIG. 1 shows that non-simulated aircraft 110 can provide aircraft sensor data 112 to preprocessing 120.

Non-simulated aircraft 110 can be controlled using controls aboard non-simulated aircraft 110 (e.g., controls utilized by a human pilot, controls provided by an autopilot aboard non-simulated aircraft 110) and/or by flight commands 142 received via flight control interface 140. Flight control interface 140 can be connected to one or more actuators and/or other devices of non-simulated aircraft 110 and, in response to flight commands 142, can control the connected actuators and/or other devices that can control flight-related aspects and perhaps other aspects of non-simulated aircraft 110. For example, if non-simulated aircraft 110 is equipped with weaponry, flight control interface 140 and flight commands 142 may be able to control the weaponry.

Preprocessing 120 can receive aircraft sensor data 112 from non-simulated aircraft 110 and generate condition data 122 based on received aircraft sensor data 112. Condition data 122 can include observations and/or data about non-simulated aircraft 110, such as, but not limited to, elevation data, airspeed data, ground speed data, position data, velocity data, acceleration data, heading data, meteorological data (e.g., wind-related data, precipitation-related data, barometric pressure data, visibility data), and/or data about other aircraft in the environment of non-simulated aircraft 110.

Preprocessing 120 can use one or more coordinate transformations 124 to generate condition data 122. For example, a coordinate transformation of coordinate transformations 124 can transforms coordinates into a proper subset of coordinates possible in the coordinate-related input resulting in a transformed coordinated-related input. As another example, a coordinate transformation of coordinate transformations 124 can convert data about an another aircraft in the environment of non-simulated aircraft 110 expressed in 360 degree format to related data expressed in 180 degree format; that is, the coordinate transformation can "flips" or transform coordinates for the other aircraft if the other aircraft is on a particular side (e.g., a left side) of non-simulated aircraft 110, but does not flip the coordinates for the other aircraft if the other aircraft is not on the particular side (e.g., on a right side) of non-simulated aircraft 110. Other coordinate transformations of coordinate transformations 124 are possible as well Machine learning algorithm 130 can include one or more learnable parameters. In some examples, machine learning algorithm 130 can use learnable parameters determined using one or more polynomials, one or more linear combinations of Fourier basis functions, one or more linear combinations of radial basis functions coarse coding, tile coding, or any other feature extraction scheme. In some examples, machine learning algorithm 130 can include one or more ANNs with learnable weights.

In the example shown in FIG. 1, machine learning algorithm 130 can include policy/value networks 134, which can include one or more ANNs. Policy/value networks 134 can have ANN(s) whose nodes have randomly initialized weights. Machine learning algorithm 130, including policy/value networks 134, can be trained to learn desired behaviors in two-aircraft scenarios, where training involves changing the (randomly initialized) weights based on outcomes of training scenarios. In some examples, policy/value networks 134 can be trained using a reinforcement learning algorithm during training scenarios that involve a series of interactions between an agent, represented by policy/value networks 134, and an environment, represented by simulator 150.

During training of machine learning algorithm 130, simulator 150 can carry out one or more instances of a particular two-aircraft scenario; e.g., a cooperative scenario, an adversarial scenario. One instance of the particular two-aircraft scenario can be termed an episode, and a predetermined number of episodes (e.g., 500, 1000, 10000) can be termed an epoch. Each episode of a two-aircraft scenario can last for a predetermined maximum number of time units (e.g., 100 units, 1000 units, 2500 units, 128,000 units, etc.) where a time unit can represent a predetermined number of milliseconds (e.g., 250 milliseconds, 500 milliseconds, 2000 milliseconds, etc.)

At the start of an episode of a two-aircraft scenario, simulator 150 can place both aircraft in a simulated environment, where each aircraft is controlled by an agent. In some examples, simulator 150 can initialize one or both aircraft in the two-aircraft scenario with random positions, orientations, and/or velocities. In some examples, simulator 150 can randomize other characteristics of one or both aircraft in the two-aircraft scenario; e.g., maximum speed, maximum turn rate and/or characteristics of the environment; e.g., wind speed, precipitation conditions, size/shape of the environment. As such, simulator 150 can provide machine learning algorithm 130 a wide range of starting conditions, vehicle characteristics, and environmental factors for training.

At the beginning of each time step of an episode, the agents provide simulator 150 with actions for controlling their respective aircraft. For example, machine learning algorithm 130 can act as a friendly agent and provide actions; e.g., one or more training flight actions 180, to control friendly aircraft 164 and another entity can act as an opponent agent to provide actions to control opponent aircraft 160. The opponent agent can be controlled using any technique; e.g., methods relying on machine learning, rule-based, planner, human input, etc. In response to receiving actions from both the friendly agent and the opponent agent for the time step, simulator 150 can update the simulated environment, advance time by one time step, and provide the friendly and opponent agents with a next observation and/or one or more reward signals. For example, simulator 150 can provide simulated condition data/reward signals 182 to machine learning algorithm 130 as next observation and/or reward signals for friendly aircraft 164.

A reward signal can indicate a score of performance of the most recent outcome, where the reward signal can be based on one or more dynamic and kinematic properties of an aircraft in the environment. That is, the reward signal can be based on one or more of: a location of an aircraft within the environment, a velocity of the aircraft within the environment, an acceleration of the aircraft within the environment, a position of the aircraft within the environment relative to another aircraft, and a distance between the aircraft and another aircraft.

For example, in a cooperative two-aircraft scenario where one aircraft refuels the other aircraft, a positive reward signal can be provided to each agent of the two aircraft when the two aircraft "close in" or reduce distance between the aircraft, a negative reward signal can be provided to each agent of the two aircraft when the two aircraft increase distance between the aircraft, and a larger positive reward signal can be provided to each agent of the two aircraft when the two aircraft reach a designated position where the one aircraft could refuel the other aircraft. As another example, in an adversarial two-aircraft scenario of air-to-air combat, a positive reward signal can be provided to each agent of the two aircraft when the two aircraft close in, a negative reward signal can be provided to each agent of the two aircraft when the two aircraft increase distance between the aircraft, a larger positive reward signal can be provided to an agent of an aircraft that obtains a firing position directly behind the other aircraft and a corresponding negative reward signal can be provided to an agent of the other aircraft, and an even-larger positive reward signal can be provided to an agent of an aircraft that defeats the other aircraft and a corresponding negative reward signal can be provided to an agent the other aircraft. Other reward signals associated with two-aircraft scenarios are possible as well.

Various termination criteria can be used to determine an end of an episode of a scenario. An episode of a two-aircraft scenario involving opponent aircraft 160 and friendly aircraft 164 can end when friendly aircraft 164 is defeated by opponent aircraft 160 (or vice versa) and/or after the predetermined maximum number of time units for the episode have elapsed. In related examples, the two-aircraft scenario can terminate when one or both aircraft reach a desired position relative to each other. In one example, the two-aircraft scenario can terminate when one aircraft reaches one or more designated positions in the environment; e.g., an adversarial two-aircraft scenario can end after either opponent aircraft 160 or friendly aircraft 164 has reached one or more waypoints in the environment. As another example, an episode of a cooperative two-aircraft scenario where friendly aircraft 164 attempts to carry out a refueling operation with opponent aircraft 160 acting as a tanker aircraft can end when friendly aircraft 164 is in a position to being refueling with opponent aircraft 160 or after a refueling operation has completed. As another example, an episode of an adversarial two-aircraft scenario can end when friendly aircraft 164 reaches a firing position directly behind opponent aircraft 160 or when opponent aircraft 160 reaches a firing position directly behind friendly aircraft 164. Other termination criteria for these two-aircraft scenarios are possible as well; e.g., if one or both of opponent aircraft 160 and friendly aircraft 164 is/are destroyed and/or otherwise defeated, leave the environment, if opponent aircraft 160 and friendly aircraft 164 are beyond a predetermined distance of each other and/or beyond a predetermined distance of a designated location within the environment. Other termination criteria that can be used to determine when an episode training of machine learning algorithm 130 is complete and/or when a two-aircraft scenario is complete are possible as well.

Additional termination criteria can be used to determine when training of machine learning algorithm 130 is complete. For example, machine learning algorithm 130 can be considered to be trained after completion of a predetermined number of episodes of a scenario; e.g., after 300 episodes, after one or more epochs. As another example, machine learning algorithm 130 can be considered to be trained after an average reward value exceeds a predetermined average reward value and/or if a derivative of the average reward value representing change of average reward value is less than a predetermined minimum derivative value for a predetermined number of episodes; e.g., if the derivative of the average reward value is less than a predetermined percentage and/or predetermined number of reward units over a period of time, such as a termination criteria for training when the absolute value of the derivative average reward value over 500 episodes is less than 1% of a maximum possible reward value. A combination of these criteria can be used as well; e.g., a termination criterion for training when either 2 epochs have been completed or when the average reward value exceeds an 80% of the maximum possible reward value, whichever comes first. Other termination criteria that can be used to determine when training of machine learning algorithm 130 is complete are possible as well.

An episode of a scenario can result in a trajectory of states, actions, and rewards throughout the scenario. For example, if a two-aircraft scenario takes 1000 time steps, a trajectory for the friendly agent can include 1000 sets of states of an environment, actions taken, and rewards provided to the friendly agent related to the friendly aircraft of the two-aircraft scenario.

A reinforcement learning algorithm can improve future behavior by adjusting learnable parameters of machine learning algorithm 130 e.g., weights of nodes of policy/value networks 134 of MLA 130, according to the trajectory. For each step in the trajectory, the reinforcement learning algorithm can calculate an "advantage" of a selected action, or amount of rewards provided in response to the action that are better (or worse) than an average amount of rewards provided during the episode; e.g., rewards indicated by reward signals in simulated condition data/reward signals 182. If the action resulted in better-than-expected rewards, and so the advantage of the action would be positive, the reinforcement learning algorithm can adjust the learnable parameters of machine learning algorithm 130 to increase a likelihood of future occurrence of the action, given a state of an environment from which the action was based. If the action resulted in worse-than-expected rewards and so the advantage of the action would be negative, the reinforcement learning algorithm can adjust the learnable parameters of machine learning algorithm 130 to decrease the likelihood of future occurrence of the action.

The reinforcement learning algorithm can use gradients related to the output actions of policy/value networks 134 to update at least learnable parameters of policy network portions of policy/value networks 134. In some examples, the gradients related to the output actions of the policy network can also be used to update learnable parameters of value network portions of policy/value networks 134, enabling the value network to learn along with policy network. The reinforcement learning algorithm adjustments can make these adjustments to the learnable parameters of machine learning algorithm 130 using an adjustment technique based on stochastic gradient descent, momentum optimization, Nesterov momentum optimization, RMSProp optimization, Adam optimization, or any technique similar to these.

In some examples, policy/value networks 134 can be combined in a combined policy/value ANN, or combined policy/value network for short, such as discussed above at least in the context of FIG. 2B. The combined policy/value network can produce both action outputs and value estimates. In some examples, an entropy of an action distribution can be added to an objective function and/or a loss function used by the reinforcement learning algorithm i.e., to encourage exploration of a space of available actions by the policy network.

Simulated condition data/reward signals 182 can include data about a simulated aircraft simulated by simulator 150 and/or one or more reward signals. The data about the simulated aircraft can include, but is not limited to, elevation data, airspeed data, ground speed data, position data, velocity data, acceleration data, heading data, meteorological data (e.g., wind-related data, precipitation-related data, barometric pressure data, visibility data), and/or data about other aircraft in the environment of the simulated aircraft. Machine learning algorithm 130 can use the data about the simulated aircraft to generate one or more actions to control the simulated aircraft in a simulated two-aircraft scenario, and provide those action(s) as part of training flight action(s) 180 to simulator 150.

The reward signal(s) of simulated condition data/reward signals 182 can indicate effectiveness of training flight action(s) 180 previously provided to simulator 150. That is, if simulator 150 determines an action of training flight action(s) 180 provided at time t is effective, then simulator 150 can provide a reward signal at time t+1 to machine learning algorithm 130 as part of simulated condition data/reward signals 182. However, if simulator 150 determines an action of training flight action(s) 180 provided at time t is not effective, then simulator 150 can provide a penalty signal and/or withhold providing a reward signal at time t+1 to machine learning algorithm 130 as part of simulated condition data/reward signals 182. As such, the reward signals of simulated condition data/reward signals 182 can be used to update the weights of ANNs of policy/value networks 134; e.g., increase weights associated with actions that lead to reward signals, decrease weights associated with actions that do not lead to reward signals and/or lead to penalty signals.

Simulator 150 can include simulation display 152 and simulation software 156. Simulation display 152 can provide output related to one or more simulations being conducted by or previously conducted by simulator 150; e.g., using simulation software 156. The one or more simulations conducted by simulator 150 can include simulations of two-aircraft scenarios.

FIG. 1 shows simulation display 152 having video region 154a and data region 154b. Video region 154a shows a display related to a two-aircraft scenario involving opponent aircraft 160 and friendly aircraft 164. Video region 154a also shows that both simulated opponent aircraft 160 and friendly aircraft 164 have simulated ranged sensors that are capable of sensing an environment within a sensor cone; e.g., sensor cone 162 for opponent aircraft 160 and sensor cone 166 for friendly aircraft 164. FIG. 1 shows that data region 154b of simulation display 152 indicates that the two-aircraft scenario shown in video region 154a is episode "501" of an epoch of "1000" episodes. FIG. 1 also shows that data region 154b provides running results of the two-aircraft scenario during the epoch—as of episode "501" of the epoch for an adversarial scenario, friendly aircraft 164 has "409" wins, which is "82%" of the 501 episodes, opponent aircraft 160 has "11" wins, which is "2%" of the 501 episodes, and "80" or "16%" of the 501 episodes are draws where neither friendly aircraft 164 nor opponent aircraft 160 wins the episode.

Simulation software 156 includes coordinate transformations 170, curriculum scenarios 172, and annealed scenarios 174. Simulation software 156 can simulate an environment for two-aircraft scenarios where a friendly agent, such as machine learning algorithm 130, provides actions, such as training flight action(s) 180, to simulation software 156 to control friendly aircraft 164 and an opponent agent provides actions to control opponent aircraft 160 in a two-aircraft scenario. In response to the actions provided by both the friendly and opponent agents, simulation software 156 can update the simulated environment to carry out the actions provided by the agents and provide data, such as simulated condition data/reward signals 182, to one or both of the friendly and opponent agents. Simulation software 156 can also determine when an episode of the two-aircraft scenario has completed and track wins or other result data for one or both of the friendly and opponent agents. Also, simulation software 156 can generate video output that can be display using simulation display 152 and/or one or more other displays.

Coordinate transformation(s) 170 can be the same or similar coordinate transformations to coordinate transformations 124 discussed above, and simulation software 156 can use coordinate transformations 170 in the same or a similar fashion as preprocessing 120 uses coordinate transformations 124. Curriculum scenarios 172 can include an ordered series of two-aircraft scenarios arranged in (gradually) increasing complexity, where a first scenario of curriculum scenarios 172 is intended to be a relatively low-difficulty scenario and subsequent scenarios are intended to be progressively increasingly difficult scenarios.

As an example involving adversarial two-aircraft scenarios, some or all scenarios of curriculum scenarios 172 can be scenarios using pre-existing threat models. By training on curriculum scenarios 172, machine learning algorithm 130 learns to become a specialized expert at countering one or more threat models of each scenario of curriculum scenarios 172 and exploiting weaknesses of the threat model(s), as training allows machine learning algorithm 130 to engaging the threat model(s) over multiple training episodes.

Annealed scenarios 174 can include a series of two-aircraft scenarios where each scenario of annealed scenarios 174 has a different set of initial conditions. That is, machine learning algorithm 130 can learn by carrying out annealed scenarios 174 that "anneals" or expands selections of conditions related to a search space for an agent controlled by machine learning algorithm 130. In some examples, such selections of conditions can be related to an aircraft and/or environmental parameters and/or related to a search space. More specifically, a first annealed scenario of annealed scenarios 174 may not allow changes in airspeed for at least the friendly aircraft, a second annealed scenario of annealed scenarios 174 may allow changes in airspeed within a first predetermined range of airspeeds (e.g., between 150-160 knots per hour), a third annealed scenario of annealed scenarios 174 may allow changes in airspeed within a second predetermined range of airspeeds that differs from the first predetermined range of airspeeds (e.g., between 130-140 knots per hour), and so on.

As another example of annealed scenarios 174, a first annealed scenario of annealed scenarios 174 may not allow changes in elevation while allowing airspeed changes for at least the friendly aircraft, a second annealed scenario of annealed scenarios 174 may allow airspeed changes and changes in elevation within a first predetermined range of elevations (e.g., between 1000-1500 feet above ground), a third annealed scenario of annealed scenarios 174 may allow airspeed changes and changes in elevation within a second predetermined range of elevations that differs from the first predetermined range of elevations (e.g., between 800-1500 feet above ground). Other conditions, such as sensor ranges, sensor types, meteorological conditions and/or other environmental conditions (e.g., terrain and/or other features in the environment, size and/or shape of the environment), proximities of aircraft, permitted actions allowed, etc. can vary throughout the series of two-aircraft scenarios that make up annealed scenarios 174. In some examples, annealed scenarios 174 can also be a curriculum set of scenarios, where scenarios of annealed scenarios 174 are ordered to be progressively increasingly difficult scenarios.

Then, during training, machine learning algorithm 130 can carry out a first number of episodes (e.g., an epoch, a number of episodes until a desired outcome is reached a predetermined percentage of time) for a first scenario of curriculum scenarios 172, then can carry out a second number of episodes a second scenario of curriculum scenarios 172, and so on until machine learning algorithm 130 carries out, and so is trained on all scenarios of curriculum scenarios 172. Similarly, during training, machine learning algorithm 130 can carry out a first number of episodes (e.g., an epoch, a number of episodes until a desired outcome is reached a predetermined percentage of time) for a first scenario of annealed scenarios 174, then can carry out a second number of episodes a second scenario of annealed scenarios 174, and so on until machine learning algorithm 130 carries out, and so is trained on all scenarios of annealed scenarios 174. Once machine learning algorithm 130 has been trained, the trained machine learning algorithm 130 can be termed as a "model".

As such, machine learning algorithm 130 can learn from and leverage prior policies/models via a transfer learning related to curriculum scenarios 172 and/or annealed scenarios 174. Transfer learning enables machine learning algorithm 130 to be bootstrapped via the internal parameters of a similarly structured agent that had learned such behaviors from iterative exposure to related environments. For example, machine learning algorithm 130 can be trained by progressive exposure to more complex situations and environments during the learning curriculum; e.g., by being trained on curriculum scenarios 172 and/or annealed scenarios 174.

After machine learning algorithm 130 has been trained, machine learning algorithm 130 can receive condition data 122 from preprocessing 120, responsively generate one or more model flight actions 132, and provide model flight action(s) 132 to flight control interface to control non-simulated aircraft 110. Then, preprocessing 120 can be used to provide condition data 122 that is similar in format and/or type (e.g., types of data such as airspeed data, elevation data, etc. mentioned above) to data about simulated aircraft provided in simulated condition data/reward signals 182 to facilitate use of machine learning algorithm 130 in controlling non-simulated aircraft 110. Similarly, flight control interface 140 can convert model flight action(s) 132 provided by machine learning algorithm 130 into flight commands 142 for controlling actuators and/or other devices of non-simulated aircraft 110 to facilitate use of machine learning algorithm 130 in controlling non-simulated aircraft 110.

Figure 2A:
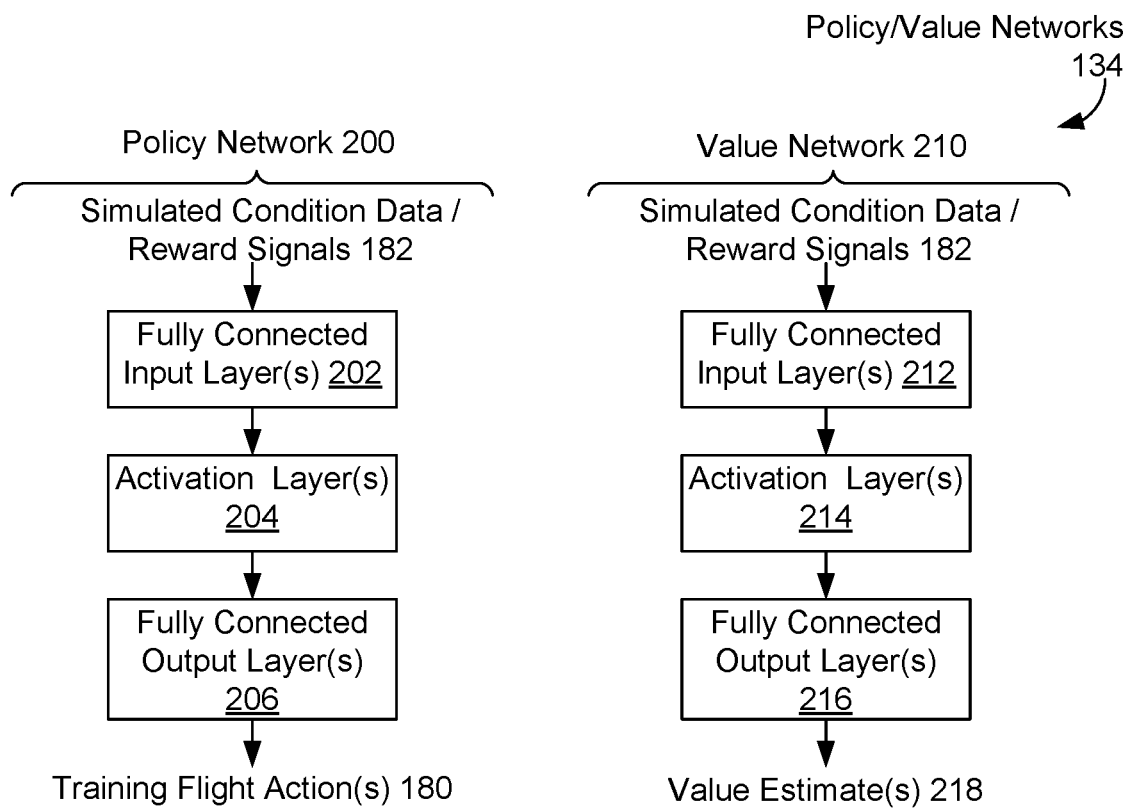
FIG. 2A is a block diagram of a policy network and of a value network, according to example embodiments.

FIG. 2A is a block diagram of policy network 200 and value network 210 of policy/value networks 134, according to example embodiments. Policy network 200 can receive simulated condition data/reward signals 182 and responsively generate training flight action(s) 180. Fully connected input layer(s) 202 of policy network 200 can receive inputs about the environment of the two-aircraft scenario and rewards for a previous action as condition data/reward signals 182. Then, fully connected input layer(s) 202 can provide one or more outputs related to condition data/reward signals 182 to one or more activation layers 204. Activation layer(s) 204 can select among possible next actions based on the environmental and reward inputs provided by fully connected input layer(s) 202 and provide related outputs regarding selections of possible next actions. The outputs of activation layer(s) 204 can be provided as inputs to one or more fully connected output layers 206, which can output training flight action(s) 180 based on these inputs. Training flight action(s) 180 can reflect selections of possible next actions for an aircraft, e.g., friendly aircraft 164.

In some examples, training flight action(s) 180 can indicate a specific action for an aircraft to take; e.g., turn left, slow down, etc. In some examples, training flight action(s) 180 can be expressed as a vector of possible actions with a weight or other value for each possible action. For example, suppose the aircraft can take one of have five possible actions during a two-aircraft scenario: (i) turn left by one unit of angular measure (e.g., one degree, five degrees), (ii) turn right by one unit of angular measure, (iii) fly faster by one unit of speed (e.g., one knot/hour, ten knots/hour), (iv) fly slower by one unit of speed, or (iv) maintain course and heading.

Continuing this example, a vector of possible actions could have weights, scores, or other values (e.g., probabilities) for each of the five possible actions; e.g., vector v[1] has a value representing turning left, vector v[2] has a value representing turning right, vector v[3] has a value representing flying faster, vector v[4] has a value representing flying slower, and vector v[5] has a value representing maintaining course and speed. Then, suppose the values of the vector v=3, 1, 6, 1, 2 where values in vector v increase as desirability of taking a corresponding action increases. Then, as the highest value of 6 in vector v is associated with vector entry v[3], and so the corresponding action for the aircraft is action (iii); that is, fly faster by one unit of speed. Other examples of actions and vectors associate with actions are possible as well.

Value network 210 can receive simulated condition data/reward signals 182 and responsively generate one or more value estimates 218. Fully connected input layer(s) 212 of value network 210 can receive inputs about the environment of the two-aircraft scenario and rewards for a previous action as condition data/reward signals 182. Then, fully connected input layer(s) 212 can provide one or more outputs related to condition data/reward signals 182 to one or more activation layers 204. Activation layer(s) 214 can weight evaluations of the environmental and reward inputs provided by fully connected input layer(s) 212 and provide related outputs regarding an evaluation of actions provided by policy network 200; e.g., for use by friendly aircraft 164. The outputs of activation layer(s) 214 can be provided to one or more fully connected output layers 216, which can output value estimate(s) 218 based on these inputs. Value estimate(s) 218 can evaluate actions provided by policy network 200 for an aircraft; e.g., friendly aircraft 164 by estimating future rewards that will be obtained after taking the actions provided by policy network 200 in the environment; e.g., an environment where the aircraft is participating in a two-aircraft scenario. In some examples, the action and value networks can be combined in a combined policy/value network, where the combined policy/value network can produce both action outputs and value outputs and may share part or all of one or more layers of the combined policy/value network.

Figure 2B:
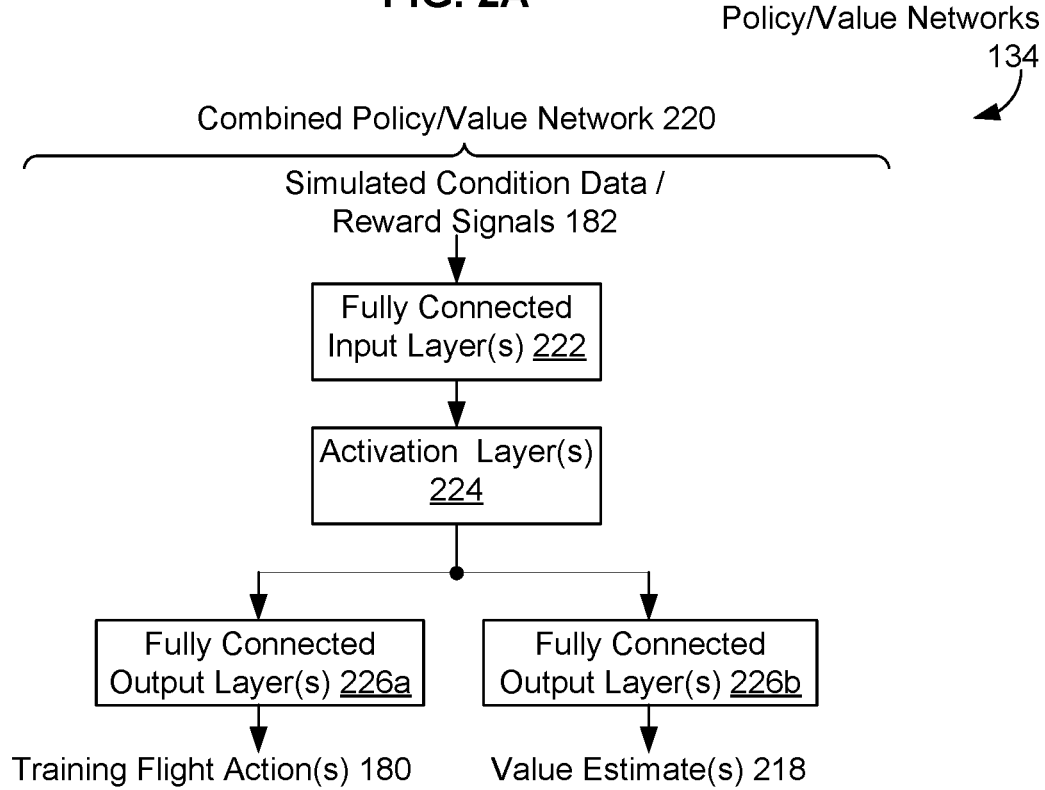
FIG. 2B is a block diagram of a combined action/value network, according to example embodiments.

FIG. 2B is a block diagram of combined policy/value network 220 of policy/value networks 134, according to example embodiments. Combined policy/value network 220 can receive simulated condition data/reward signals 182 and responsively generate training flight action(s) 180 and value estimate(s) 218. Fully connected input layer(s) 222 of combined policy/value network 220 can receive inputs about the environment of the two-aircraft scenario and rewards for a previous action as condition data/reward signals 182. In some examples, fully connected input layer(s) 222 can perform the same functions as discussed above in the context of fully connected input layer(s) 202 and/or 212.

Then, fully connected input layer(s) 222 can provide one or more outputs related to condition data/reward signals 182 to one or more activation layers 224. Activation layer(s) 224 can select among possible next actions for an aircraft and can weight evaluations of the environmental and reward inputs provided by fully connected input layer(s) 202. Activation layer(s) 224 can subsequently provide related outputs regarding selections of possible next actions and an evaluation of actions to the aircraft e.g., friendly aircraft 164. Activation layer(s) 224 can provide outputs to both of one or more fully connected output layers 226a and one or more fully connected output layers 226b. Then, fully connected output layer(s) 226a can output training flight action(s) 180 based on the inputs provided by activation layers(s) 224, where training flight action(s) 180 can reflect selections of possible next actions for an aircraft, such as discussed at least in the context of FIG. 2A. Also, fully connected output layer(s) 226b can output value estimate(s) 218 based on the inputs provided by activation layers(s) 224, where value estimate(s) 218 can evaluate actions taken by an aircraft as discussed at least in the context of FIG. 2A.

The herein-described ANNs of machine learning algorithm 130, including but not limited to policy/value networks 134, policy network 200, value network 210, and/or combined policy/value network 220, can contain at least a number of nodes usable to carry out the herein-described functionality of machine learning algorithm 130. The nodes of ANNs of machine learning algorithm 130 can be arranged in any number of layers, such as, but not limited to, hidden layers, input layers, output layers, activation layers, and/or fully connected layers; e.g., as shown in FIGS. 2A and 2B. In some examples where the input to machine learning algorithm 130 includes mage pixels, machine learning algorithm 130 can include and/or be associated with a convolutional ANN for processing image inputs, where the convolutional ANN can include one or more convolutional layers and/or one or more pooling layers. In some examples where machine learning algorithm 130 uses access to prior states, machine learning algorithm 130 can include and/or be associated with a recurrent ANN to provide memory functions/provide access to prior state, where the recurrent ANN can include one or more recurrent layers. Machine learning algorithm 130 can include other arrangements of nodes of ANNs, other types of layers, and/or other types of ANNs as well.

Figure 3:
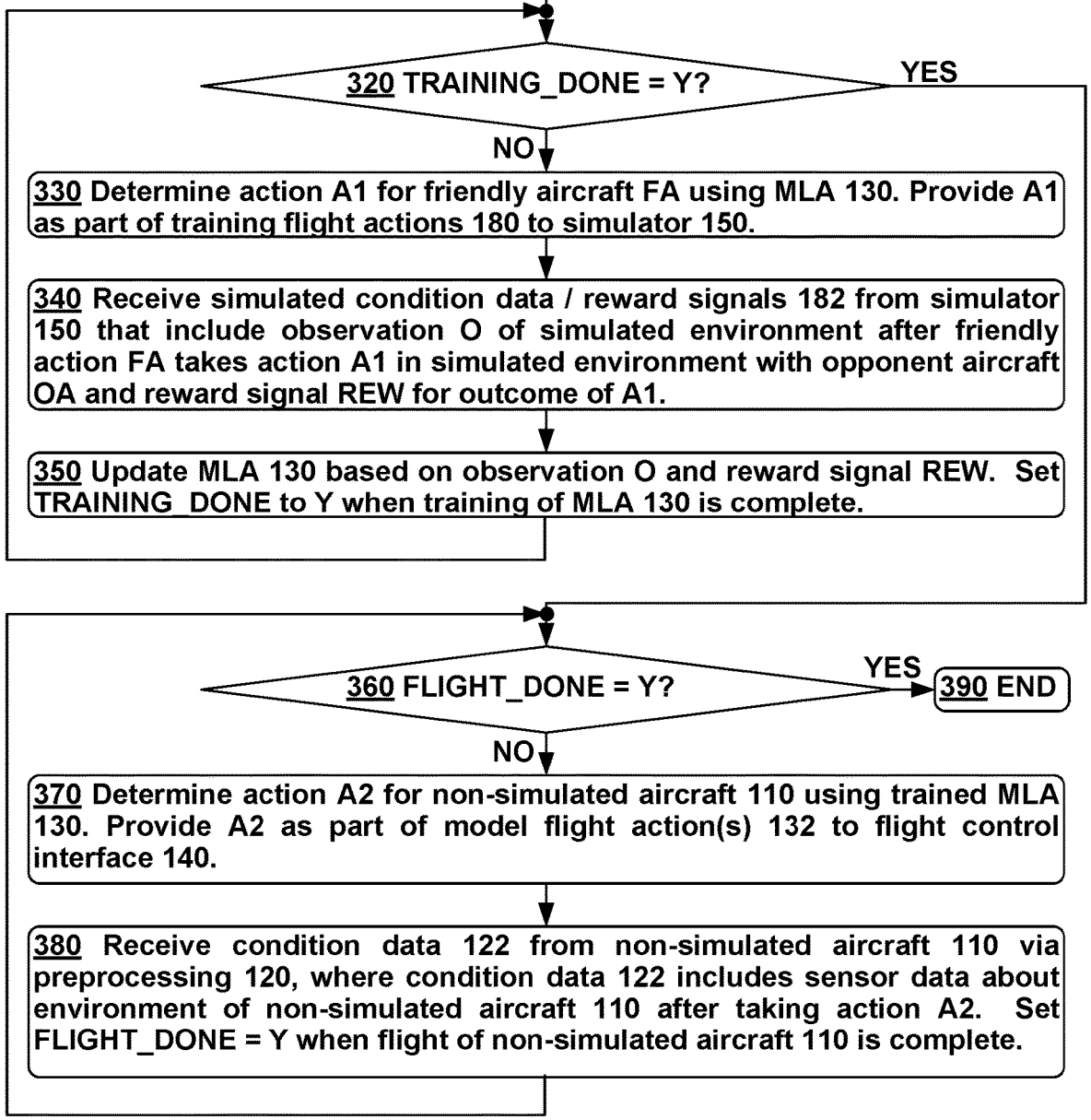
FIG. 3 is a flowchart of a method for training a machine learning algorithm and using a trained model of the machine learning algorithm to control an aircraft, according to example embodiments.

FIG. 3 is a flowchart of method 300 for training a machine learning algorithm and using a trained model of the machine learning algorithm to control an aircraft, according to example embodiments. Method 300 is executable by a computing device, such as computing device 700 described below in the context of FIG. 7.

As indicated by FIG. 3, method 300 can begin at block 310, where the computing device can initialize machine learning algorithm (MLA) 130. For example, the computing device can establish nodes and/or other data structures of MLA 130 and set node weights and/or other data to initial values, such as randomly initializing weights of nodes in policy/value networks 134. In some cases, the computing device would not initialize weights of nodes in policy/value networks 134; e.g., if policy/value networks 134 was already trained prior to beginning block 310.

Also at block 310, the computing device can initialize two variables—TRAINING_DONE and FLIGHT_DONE. For example, the computing device can initialize TRAINING_DONE and FLIGHT_DONE based on user input and/or other input. Both TRAINING_DONE and FLIGHT_DONE can take values of either "Y" (Yes) or "N" (No). The TRAINING_DONE variable can control training of MLA 130. That is, if TRAINING_DONE=Y, MLA 130 can be considered to be done with training and so can cease (or not participate in) training; and while TRAINING_DONE=N, MLA 130 will be trained. The FLIGHT_DONE variable can control whether MLA 130 is being used to control a non-simulated or actual aircraft, such as non-simulated aircraft 110. That is, if FLIGHT_DONE=Y, a flight of the non-simulated aircraft will be considered to be done and so can MLA 130 can cease (or not participate in) the non-simulated aircraft, and while TRAINING_DONE=N, MLA 130 will be available for controlling the non-simulated aircraft.

At block 320, the computing device can determine whether TRAINING_DONE equals Y. If TRAINING_DONE equals Y, then the computing device can proceed to block 360. Otherwise, the computing device can proceed to block 330.

At block 330, MLA 130 can be trained to control a simulated friendly aircraft FA during a two-aircraft scenario by providing actions to control friendly aircraft FA in a simulated environment provided by simulator 150, such as discussed at least in the context of FIG. 1. Another aircraft—opponent aircraft OA—also participates in the two-aircraft scenario. In method 300, opponent aircraft OA is controlled by another entity than MLA 130.

Also at block 330, the computing device can determine action A1 for friendly aircraft FA using MLA 130 and can provide action A1 as part of training flight action(s) 180 to simulator 150, such as discussed at least in the context of FIG. 1.

At block 340, the computing device can receive simulated condition data/reward signals 182 from simulator 150 that include observation O of the simulated environment after friendly action FA takes action A1 in the simulated environment, such as discussed at least in the context of FIG. 1. During the two-aircraft scenario, observation O can also account for an action taken by opponent aircraft OA such as discussed at least in the context of FIG. 1. The simulated condition data/reward signals 182 can also include reward signal REW that indicates the desirability of the outcome of A1.

At block 350, the computing device can update MLA 130 based on observation O and reward signal REW. For example, the computing device can use a reinforcement learning algorithm to update learnable parameters of MLA 130; e.g., nodes of policy/value network 134, based on reward signal REW, such as discussed above in the context of FIG. 1. Also at block 350, the computing device can use one or more termination criteria to determine whether an episode of training is complete and/or when training of MLA 130 is complete, such as discussed above in the context of at least FIG. 1. Then, the computing device can set TRAINING_DONE to Y after determining that training of MLA 130 is complete. Upon completion of block 350, the computing device can proceed to block 320.

At block 360, the computing device can determine whether FLIGHT_DONE equals Y. If FLIGHT_DONE equals Y, then the computing device can proceed to block 390 where method 300 will end. Otherwise, the computing device can proceed to block 370.

At block 370, the computing device can determine an action A2 for non-simulated aircraft 110 using trained MLA 130. Then, the computing device can provide A2 as part of model flight action(s) 132 to flight control interface 140.

At block 380, the computing device can receive condition data 122 from non-simulated aircraft 110 via preprocessing 120, where condition data 122 includes sensor data about environment of non-simulated aircraft 110 after taking action A2. The computing device can FLIGHT_DONE=Y when flight of non-simulated aircraft 110 is complete. Upon completion of block 380, the computing device can proceed to block 360.

At block 390, the computing device can terminate method 300.

Figure 4:
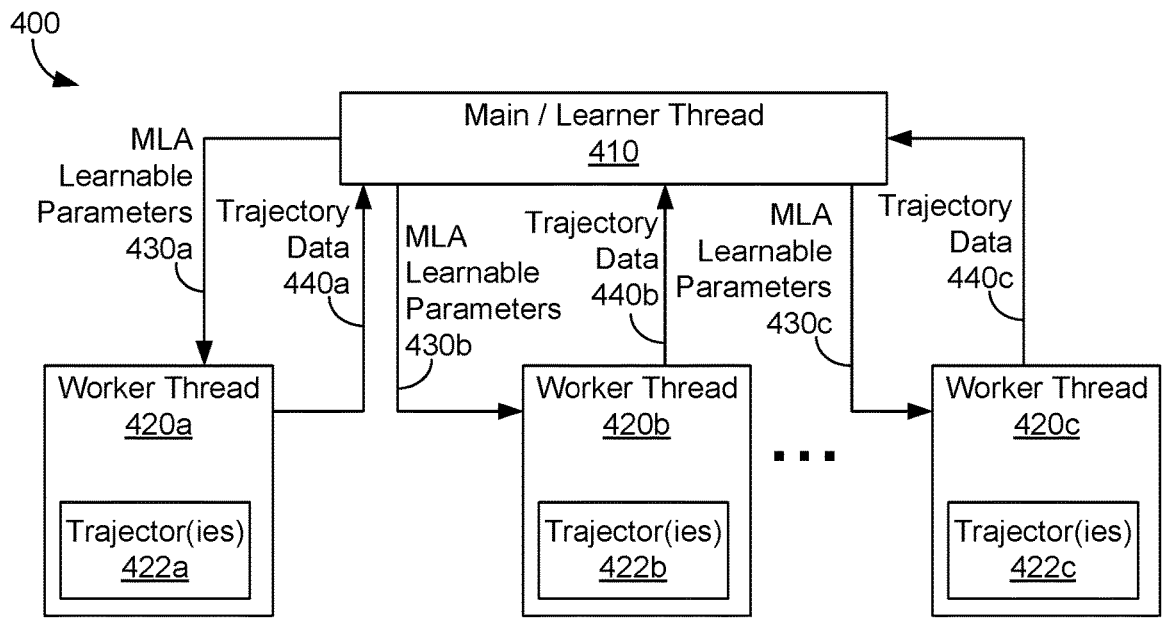
FIG. 4 is a block diagram of a parallelization architecture for training a machine learning algorithm, according to example embodiments.

FIG. 4 is a block diagram of parallelization architecture 400 for training a machine learning algorithm, such as machine learning algorithm 130, according to example embodiments. Parallelization architecture 400 includes main/learner thread 410 and worker threads 420a, 420b, 420c. A thread, such as main/learner thread 410, worker thread 420a, worker thread 420b, or worker thread 420c, can represent a sequence of instructions being executed by a processor; e.g., a processor such one or more of processor(s) 703 of computing device 700. A thread can be executed as part of a process, which is an instance of a computer program being executed by a processor. In some examples, a process can have multiple threads executing concurrently and/or in parallel. For example, one computer program CP1 could include instructions for a herein-described worker thread and a process that is an instance of CP1 could have multiple worker threads (e.g., worker threads 420a, 420b, 420c) executing concurrently and/or in parallel.

Parallelization architecture 400 can enable an asynchronous parallel approach to train machine learning algorithm 130. Each of worker threads 420a, 420b, 420c can operate concurrently and/or in parallel with its own copy of machine learning algorithm 130 and simulator 150, and its own copy of an agent needed to control the other aircraft (e.g., opponent aircraft 160), needed to control the vehicles in the environment. In some examples, more or fewer than three worker threads can be utilized by parallelization architecture 400.

While training machine learning algorithm 130, each of worker threads 420a, 420b, 420c can obtain trajectory data during an episode (or other training duration) that can be saved as one or more respective trajectories 422a, 422b, 422c. When finished producing trajectory data, worker threads 420a, 420b, 420c can send its trajectory data; e.g., respective trajectories 422a, 422b, 422c as respective trajectory data 440a, 440b, 440c to main/learner thread 410. Then, main/learner thread 410 can act as a central entity to update learnable parameters of machine learning algorithm 130; e.g., weights of nodes of policy/value networks 134, and to send the updated learnable parameters of machine learning algorithm 130 back to worker threads 420a, 420b, 420c as respective MLA learnable parameters 430a, 430b, 430c. Before each of worker threads 420a, 420b, 420c start training machine learning algorithm 130, the worker thread can update its copy of machine learning algorithm 130 with its respective MLA learnable parameters, so that future trajectories are based on an up-to-date version of the machine learning algorithm 130. The training and updating cycle of machine learning algorithm 130 can continue until machine learning algorithm 130 is trained.

In some examples, worker threads 420a, 420b, 420c can calculate model weight updates using the herein-described reinforcement learning algorithm and can send the model weight updates as part of trajectory data to main/learner thread 410. In some examples, machine learning algorithm 130 can be trained using "bootstrapping", where machine learning algorithm 130 is updated after a number N of time steps; e.g., 1-step bootstrapping where machine learning algorithm 130 is updated after one time step, N-step bootstrapping where machine learning algorithm 130 is updated after an integer N>0 time steps, full episode bootstrapping where machine learning algorithm 130 is updated after one or more entire episodes.

In some examples, learnable parameters of machine learning algorithm 130 can be "checkpointed" or saved as a "checkpoint" or copy of the learnable parameters of machine learning algorithm 130. Checkpoints can be taken upon request (e.g., in response to a command or other request), after an amount of wall-clock time taken to train machine learning algorithm 130 (e.g., after each day of training machine learning algorithm 130), after a number of time steps and/or episodes of training (e.g., after a number of time steps, episodes, and/or epochs). Then, a copy of machine learning algorithm 130 can be initialized using a checkpoint; that is, the saved learnable parameters of the checkpoint can be used to initialize the learnable parameters of the copy of machine learning algorithm 130. The checkpoint can be used in subsequent training epochs and/or to set values of the learnable parameters for a model/trained copy of machine learning algorithm 130.

In some examples, parallelization architecture 400 can use an asynchronous approach with trajectories. That is, once a worker thread of parallelization architecture 400 finishes a number of training episodes and is ready to send trajectory data, the worker thread can send the completed trajectory data to main/learner thread 410. In turn, main/learner thread 410 can determine updated weights for machine learning algorithm 130 using the trajectory data and provide the worker thread with the updated weights; e.g., as part or all of updated MLA learnable parameters 430a, 430b, or 430c. That is, main/learner thread 410 can carry out training of machine learning algorithm 130 asynchronously by processing each set of trajectory data as received.

In some examples, parallelization architecture 400 can use an asynchronous approach with gradients. The asynchronous approach with gradients is similar to the asynchronous approach with trajectories, except that each worker thread can calculate a gradient of a loss function that is based on difference between a value estimate provided by the value network and a discounted cumulative reward for an agent embodied by the worker thread. Then, the worker threads can send the gradients back to main/learner thread 410 instead of (or along with) sending trajectory data.

In some examples, parallelization architecture 400 can use a synchronous approach with batch learning. The synchronous approach with batch learning can involve having all worker threads of parallelization architecture 400 working on generating trajectory data simultaneously, while main/learner thread 410 waits for all worker threads to finish. Then, after the last worker thread provides its trajectory data, main/learner thread 410 can perform a single training step using the trajectory data provided by all of the worker threads to update weights of machine learning algorithm 130. Then, main/learner thread 410 can send updated weights to all of the worker threads before they start creating new trajectories.

Table 1 below shows example pseudo code for each of worker threads 420a, 420b, 420c.

TABLE 1

```
worker_thread(vector theta_pi', vector theta_v') {
    initialize trajectory;
    synchronize policy network pi with theta_pi'; // theta_pi' =
    weights for policy network
    synchronize value network v with theta_v'; // theta_v' =
    weights for value network
    t = 0;
    get state s_t; // from simulator and/or actual aircraft data
    // carry out training episode
    repeat
        select action_t according to policy network pi;
        determine value_t according to value network v;
        add value_t and action_t as time step t of trajectory;
        get reward_t and s_t+1 based on action_t; // proceed with
        scenario
        t = t + 1
    until (terminate_episode(t, reward_t, s_t+1) == TRUE))
    trajectory.nsteps = t;
    return trajectory; // communicate trajectory to main learner thread
}
```

Table 1 shows that a worker thread can receive two input parameters—theta_pi' and theta_v', which are updated weights for respective policy and value networks of machine learning algorithm 130. In some examples, one parameter of updated weights for a combined policy and value network of machine learning algorithm 130 is provided to a worker thread rather than both theta_pi' and theta_v'.

Table 1 indicates that a worker thread can begin by initializing a trajectory to be provided as trajectory data. Then, a policy network pi available to the worker thread can be updated/synchronized using the input theta_pi' weights and a value network v available to the worker thread can be updated/synchronized using the input theta_v' weights. The worker thread can initializes variable t to 0 and can get a state s_t of the environment from a simulator or an actual aircraft associated with the worker thread. The worker thread can then iterate through a repeat loop to carry out the two-aircraft scenario and store related trajectory data.

Table 1 indicates that one iteration of the repeat loop can involve: selecting an action action_t for an aircraft of a two-aircraft scenario using policy network pi, determining a value estimate value_t for action_tusing value network v; adding action_t and value_t as time step t of the previously-initialized trajectory; proceeding with the two-aircraft scenario by providing action_t to the simulator or actual aircraft associated with the worker thread and receiving reward_t and state s_t+1 from the simulator or actual aircraft; and incrementing t by 1. The repeat loop terminates when one or more termination conditions are met as implemented using a terminate_episode( ) function. After the repeat loop has terminated, the trajectory can be updated to set a number time steps (trajectory.nsteps) equal to the t variable, and the trajectory is returned or otherwise communicated to main/learner thread 410. After the trajectory is returned or otherwise communicated to main/learner thread 410, the worker thread can terminate.

Table 2 below shows example pseudo code for main/learner thread 410.

TABLE 2

```
main_learning_thread(vector theta_pi, vector theta_v) {
    trajectory = get_trajectory(trajectory_queue);
    nsteps = trajectory.nsteps;
    t = 0;
    initialize discounted_cumulative_reward;
    // calculate reward for each step to update theta_pi and theta_v
    while (nsteps > t)
        state = get_trajectory_state(trajectory, t); // get trajectory
        state for step t;
        action = get_trajectory_action(trajectory, t); // get trajectory
        state for step t;
        advantage = discounted_cumulative_reward - value(state);
        log_prob = logarithm of probability of selecting action given
        state;
        p_cost = -log_prob * advantage;
        v_cost = 0.5 *
        square_difference(discounted_cumulative_reward,
        value(state));
        cost = p_cost + v_cost;
        apply optimization algorithm to find gradients of reward function
        that minimize
            cost;
        update theta_pi and theta_v based on gradients;
        update discounted_cumulative_reward;
        t = t + 1;
    end while
    start one or more worker threads with updated network parameters
    theta_pi and theta_v;
}
```

Table 2 shows that main/learner thread 410 can receive two input parameters—theta_pi and theta_v, which are weights for respective policy and value networks of machine learning algorithm 130. In some examples, one parameter of updated weights for a combined policy and value network of machine learning algorithm 130 is provided to main/learner thread 410 rather than both theta_pi and theta_v.

Table 2 indicates that main/learner thread 410 can begin by initializing a trajectory variable, or trajectory for short in this description of Table 2, as the result of retrieving a trajectory from a trajectory queue using a get_trajectory( ) function. Then, an nsteps variable can be initialized to be a number of steps of the trajectory; e.g., trajectory.nsteps a t variable can be initialized to 0, and a discounted_cumulative_reward variable for a discounted cumulative reward can be initialized. Main/learner thread 410 then iterates through a while loop to update the weights represented by theta_pi and theta_v using a reinforcement learning algorithm applied to the previously initialized trajectory.

Table 2 indicates that the while loop continues while nsteps is greater than t; i.e., while there is data in the trajectory to be processed for calculating the reward to update theta_pi and theta_v. One iteration of the while loop can involve: obtaining a state and an action for time step t from the trajectory, determining an advantage for the time step as a difference between the discounted_cumulative_reward and a value estimate of the state at time step t; determining a log_prob variable to be a logarithm of a probability of selection the action for time step t given the state at time step t; determining a policy cost (p_cost) variable to be the negative product (log_prob*advantage); determining a value cost (v_cost) variable to be one-half of the squared difference between the discounted_cumulative_reward and a value estimate of the state at time step t; determining a cost variable to be the sum of the policy cost and the value cost; applying an optimization algorithm (e.g., stochastic gradient descent, RMSProp) to find one or more gradients of a reward function that minimizes cost; updating the theta_pi and theta_v weights based on the gradients of the reward function; updating the discounted_cumulative_reward; and incrementing t by 1. After the while loop has terminated, main/learner thread 410 can continue by starting one or more worker threads with input parameters of the updated theta_pi and theta_v weights. After the worker thread(s) are started, main/learner thread 410 can terminate.

Figure 5:
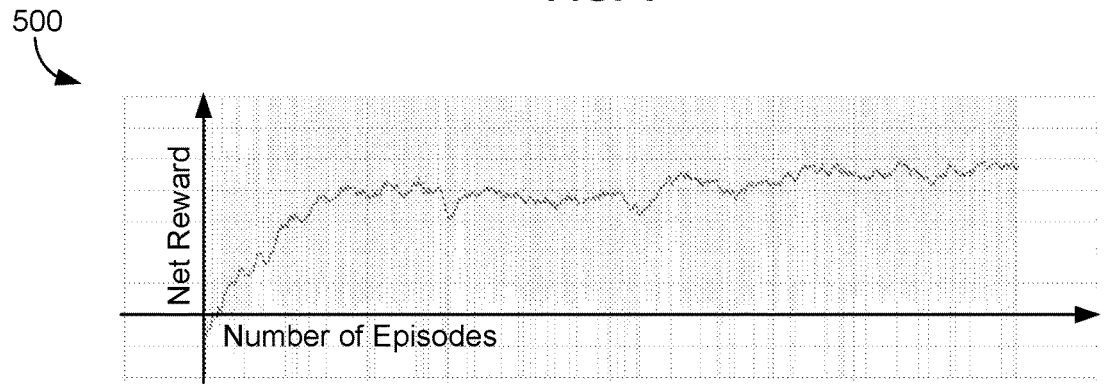
FIG. 5 is a graph showing net reward for a machine learning algorithm over a number of training episodes, according to example embodiments.

FIG. 5 shows graph 500, which shows net reward for machine learning algorithm 130 over a number of training episodes, according to example embodiments. Graph 500 demonstrates that a net reward for machine learning algorithm 130 increases as training progresses, as measured in terms of number of training episodes. The net reward shown in graph 500 is a reward for a friendly aircraft in episodes of an adversarial two-aircraft scenario where an opponent aircraft of the two-aircraft scenario is attempting to avoid detection from and simultaneously pursue the friendly aircraft.

Table 3 below also shows that training improves performance of the friendly aircraft in an adversarial two-aircraft scenario, where performance is measured in terms of wins and losses. In the context of Table 3, a win of the adversarial two-aircraft scenario is defined as a friendly aircraft controlled by machine learning algorithm 130 maneuvering into a firing position upon an opponent aircraft, a loss is vice versa, and a draw occurs when neither the friendly aircraft nor the opponent aircraft achieves a firing position on the other. In particular, Table 3 shows that training of machine learning algorithm 130 vastly improves friendly aircraft performance, as a friendly aircraft controlled by actions provided by an untrained machine learning algorithm 130 wins the adversarial two-aircraft scenario less than 1% (0.6%) of the time, while the friendly aircraft controlled by actions provided by an trained machine learning algorithm 130 wins more than 4 out of 5 episodes (82%) of the adversarial two-aircraft scenario.

TABLE 3

|  | Win | Draw | Loss |
|---|---|---|---|
| Before Training | 0.6% | 99.1% | 0.3% |
| After Training | 82% | 15.5% | 2.5% |

Machine learning algorithm 130 can learn to achieve its goal (or goals) by iteratively refining its policy through interaction with a specific opponent (or a specific coordinating aircraft) in an adversarial (or cooperative) two-aircraft scenario, in which machine learning algorithm 130 interacts with itself and transfers learning of prior policies. In some examples, machine learning algorithm 130 interacts with itself using a curriculum of scenarios; e.g., curriculum scenarios 172 and/or annealed scenarios 174.

Machine learning algorithm 130 can be used to control both aircraft of a two-aircraft scenario by using one copy of machine learning algorithm 130 as an agent to control a first aircraft in the two-aircraft scenario and using another copy of machine learning algorithm 130 as an agent to control a second aircraft in the two-aircraft scenario. The weights of the two copies of machine learning algorithm 130 used to control both aircraft of a two-aircraft scenario can be the same, implying that both copies of machine learning algorithm 130 are equally trained, or can differ, implying one copy of machine learning algorithm 130 is differently trained, and perhaps better trained, than the other copy.

When two copies of machine learning algorithm 130 participate in a two-aircraft scenario, a reward at each time step of the two-aircraft scenario can be calculated with respect to the other aircraft. Machine learning algorithm 130 to learn by playing against past copies, such as checkpoints, of itself. A past checkpoint of machine learning algorithm 130 can represent machine learning algorithm 130 at an earlier stage of development and/or training, and may help machine learning algorithm 130 produce a strategy that is generally useful against opponents with multiple skill levels.

An epoch-based structure can be used to have machine learning algorithm 130 participate against past checkpoints of itself. In the epoch-based structure, a new checkpoint can be saved and then added to a list of checkpoints during each epoch of training. This checkpoint may be saved at a last episode of the epoch, or somewhere before the last episode of the epoch. In some examples, a moving average of a net reward from each episode is determined, and a checkpoint can be saved whenever the moving average reaches a highest value encountered thus far within the epoch. Saving checkpoints when the moving average is highest can avoid saving an undesirable checkpoint; e.g., when performance happens to drop at the end of the epoch.

Figure 6:
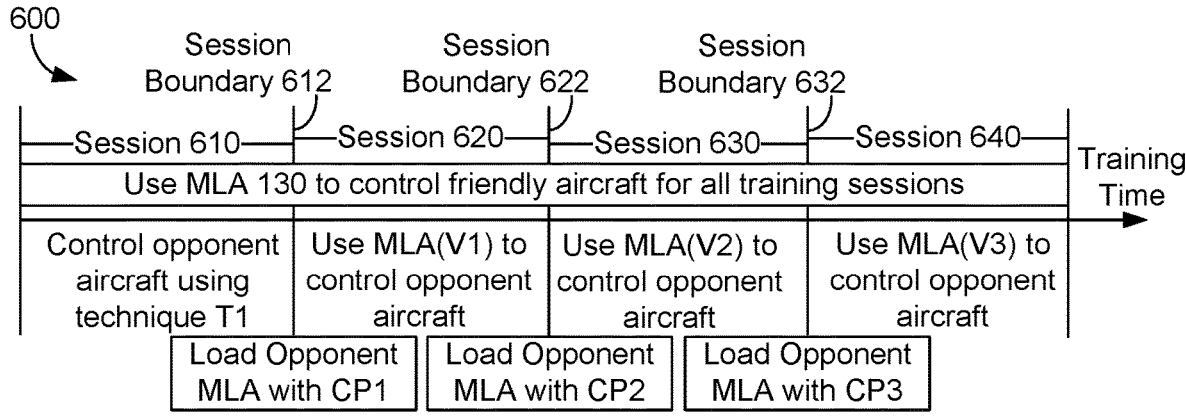
FIG. 6 is a graph showing a progression for training a machine learning algorithm to control two aircraft, according to example embodiments.

FIG. 6 shows graph 600 showing a progression for training machine learning algorithm 130 to control two aircraft, according to example embodiments. Graph 600 shows that machine learning algorithm 130 begins training at session 610, which ends at session boundary 612, continues training through session 620 ending at session boundary 622 and session 630 ending at session boundary 632, and ending with session 640.

Each session 610, 620, 630, 640 can last for a number of episodes. In some examples, a session can last for an epoch; while in other examples, a session can last for a different number of episodes than an epoch. In some examples, each of sessions 610, 620, 630, 640 can last for a same number of episodes; while in other examples, some or all of sessions 610, 620, 630, 640 can last for different numbers of episodes. In other examples, machine learning algorithm 130 can be trained for more or fewer than the four sessions shown in FIG. 6. A checkpoint of machine learning algorithm 130 can be made at an end of a session; e.g., at session boundary 612 for session 610, or earlier than at the end of the session, as discussed above.

Graph 600 illustrates that "MLA 130" can be used to control a "friendly aircraft", such as friendly aircraft 164, for all training sessions of one or more two-aircraft scenarios; that is, one copy of machine learning algorithm 130 will act as an agent to provide actions to control the friendly aircraft through each of sessions 610, 620, 630, and 640. The copy of machine learning algorithm 130 controlling the friendly aircraft can be checkpointed for each of sessions 610, 620, and 630 (and perhaps session 640) at or before respective session boundaries 612, 622, 632. That is, during session 610 (including at session boundary 612), a first check point "CP1" of machine learning algorithm 130 controlling the friendly aircraft can be saved; during session 620 (including at session boundary 622), a second check point "CP2" of machine learning algorithm 130 controlling the friendly aircraft can be saved; and during session 630 (including at session boundary 632), a third check point "CP3" of machine learning algorithm 130 controlling the friendly aircraft can be saved. Graph 600 uses "MLA(V1)" to indicate a version "V1" of machine learning algorithm 130 loaded, and thereby initialized with, checkpoint CP1, "MLA (V2)" to indicate a version "V2" of machine learning algorithm 130 loaded, and thereby initialized with, checkpoint CP2, and "MLA(V3)" to indicate a version "V3" of machine learning algorithm 130 loaded, and thereby initialized with, checkpoint CP3.

Graph 600 indicates that an agent controlling an opponent aircraft of these two-aircraft scenario(s) can differs for each session. During session 610, the "opponent aircraft" can be "control[led]" using "technique T1"; that is, any technique suitable for controlling the opponent aircraft during two-aircraft scenario(s) used during session 610. Then, during session 610, the copy of machine learning algorithm 130 controlling the friendly aircraft participates in two-aircraft scenario(s) with the opponent aircraft controlled using technique T1. Graph 600 indicates that at session boundary 612, the CP1 checkpoint can be loaded into an "Opponent MLA", which is short for a copy of machine learning algorithm 130 controlling the opponent aircraft.

Then, during session 620, the copy of machine learning algorithm 130 controlling the friendly aircraft participates in two-aircraft scenario(s) with the opponent aircraft controlled by MLA(V1), which is version V1 of machine learning algorithm 130 initialized with checkpoint CP1. At session boundary 622, the CP2 checkpoint can be loaded into the copy of machine learning algorithm 130 controlling the opponent aircraft. Then, during session 630, the copy of machine learning algorithm 130 controlling the friendly aircraft participates in two-aircraft scenario(s) with the opponent aircraft controlled by MLA(V2), which is version V2 of machine learning algorithm 130 initialized with checkpoint CP2. At session boundary 632, the CP3 checkpoint can be loaded into the copy of machine learning algorithm 130 controlling the opponent aircraft. Then, during session 640, the copy of machine learning algorithm 130 controlling the friendly aircraft participates in two-aircraft scenario(s) with the opponent aircraft controlled by MLA (V3), which is version V3 of machine learning algorithm 130 initialized with checkpoint CP3.

Figure 7:
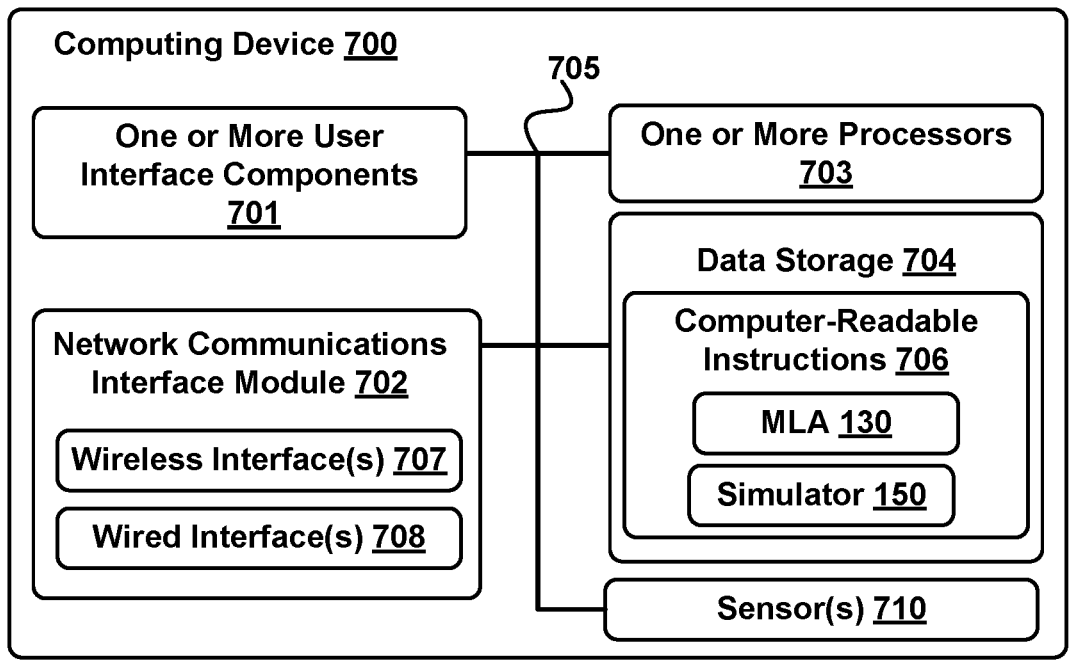
FIG. 7 is a block diagram of a computing device, according to example embodiments.

FIG. 7 is a block diagram of a computing device, according to example embodiments. Computing device 700 includes one or more user interface components 701, network-communication interface module 702, one or more processors 703, data storage 704, and sensor(s) 710, all of which may be linked together via a system bus, network, or other connection mechanism 705, in accordance with an example embodiment. In particular, computing device 700 can perform some or all of the herein-described functionality related to one or more of: a computing device, an aircraft, preprocessing, a flight control interface, a non-simulated (or actual) aircraft, a simulator, a two-aircraft scenario, a machine learning algorithm, a reinforcement learning algorithm, a parallelization architecture, system 100, methods 300, 800, parallelization architecture 400, and/or graphs 500, 600. In some embodiments, computing device 700 can be a mobile or non-mobile computing device, and can be embodied as one or more of: desktop computer, laptop or notebook computer, personal data assistant (PDA), mobile phone, smart phone, smart watch, embedded processor, and/or any similar device that is equipped with at least one processing unit capable of executing machine-language instructions that implement at least part of the herein-described techniques and methods.

User interface component(s) 701 can include one or more components that can receive input and/or provide output, perhaps to a user. User interface component(s) 701 can include one or more components configured to send and/or receive data to and/or from a user and/or other entities; such components can include but are not limited to: a keyboard, a keypad, a touch screen, a touch pad, a computer mouse, a track ball, a joystick, a game controller, button and/or other similar devices configured to receive user input from a user of and/or other entities associated with computing device 700. User interface component(s) 701 can include one or more components configured to display visual outputs; such components can include but are not limited to: but are not limited to: cathode ray tubes (CRTs), liquid crystal displays (LCDs), light emitting diodes (LEDs), displays using digital light processing (DLP) technology, printers, light bulbs, and/or other devices capable of displaying visual outputs (e.g., graphical, textual, and/or numerical information). User interface component(s) 701 can also include one or more components to generate audible output(s); such components can include but are not limited to: a speaker, speaker jack, audio output port, audio output device, earphones, and/or other similar devices configured to generate audible output(s) and/or convey sound and/or audible information; e.g., to a user of computing device 700.

Network-communication interface module 702 can be configured to send and receive data over one or more wireless interfaces 707 and/or one or more wired interfaces 708 via a data or other communications network. Wireless interface(s) 707, if present, can utilize an air interface, such as a Bluetooth®, ZigBee®, Wi-Fi™, and/or WiMAX™ interface to a data network, such as a wide area network (WAN), a local area network (LAN), one or more public data networks (e.g., the Internet), one or more private data networks, or any combination of public and private data networks. Wired interface(s) 708, if present, can comprise a wire, cable, fiber-optic link and/or similar physical connection to a data network, such as a WAN, a LAN, one or more public data networks, such as the Internet, one or more private data networks, or any combination of such networks.

In some embodiments, network-communication interface module 702 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), an Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Processor(s) 703 includes one or more central processing units, computer processors, mobile processors, digital signal processors (DSPs), graphics processing units (GPUs), microprocessors, computer chips, programmable processors, multi-core processors, and/or other processing units configured to execute machine-language instructions and process data. Processor(s) 703 can be configured to execute executable computer-readable program instructions 706 that are contained in data storage 704 and/or other instructions as described herein.

Data storage 704 includes one or more physical and/or non-transitory storage devices, such as read-only memory (ROM), random access memory (RAM), removable disk drives, hard drives, thumb drives, magnetic-tape memory, optical-disk memory, flash memory, volatile storage devices, non-volatile storage devices, and/or other storage devices. Generally, a storage device is hardware that is capable of storing information; for example, data, computer-readable program instructions, and/or other suitable information on a temporary basis and/or a permanent basis. Data storage 704 can include one or more physical and/or non-transitory storage devices with at least enough combined storage capacity to contain executable computer-readable program instructions 706 and any associated/related data structures. In some embodiments, some or all of data storage 704 can be removable, such as a removable hard drive, removable disk, or flash memory.

Computer-readable program instructions 706 and any data structures contained in data storage 704 include computer-readable program instructions executable by processor(s) 703 and any storage required, respectively, to perform at least part of the herein-described functionality of a computing device. For example, data storage 704 can also store data used to perform at least part of the herein-described functionality of a computing device. Computer-readable program instructions 706 can include executable instructions that, when executed by processor(s) 703, cause computing device 700 to perform functions, including but not limited to herein-described functionality of software, machine learning algorithms, simulators, aircraft, displays, and/or user interfaces.

In some examples, computing device 700 includes one or more sensors 710. Sensor(s) 710 can be configured to measure conditions in an environment around computing device 700 and provide data about the measured conditions of the environment. The data can include, but are not limited to: meteorological conditions including, but not limited to, wind speed, wind direction, temperature, humidity, barometric pressure, and/or rainfall; location data about computing device 700 including, but not limited to, latitude, longitude, and/or altitude data; kinematic information (e.g., location, speed, velocity, acceleration data) related to computing device 700, one or more vehicles, and/or one or more aircraft, and electromagnetic radiation data (e.g., infra-red, ultra-violet, X-ray data). The one or more sensors 710 can include, but are not limited to, one or more: Global Positioning System (GPS) sensors, location sensors, gyroscopes, accelerometers, magnetometers, video and/or still cameras, light sensors, infrared sensors, ultraviolet sensors, X-ray sensors, meteorological sensors, proximity sensors, vibration and/or motion sensors, heat sensors, thermometers, lasers, wind sensors, barometers, rain gauges, and microphones. Other examples of sensor(s) 710 are possible as well.

In some examples, sensors 710 can be utilized for relative position sensing, where relative position sensing provides information about aircraft velocity relative to a vehicle; e.g., using differential GPS and/or radio-based triangulation methods. In particular of these examples, computing device 700 and sensors 710 can provide and use relative position sensing in order to automate features related to aircraft guidance, vehicle guidance, and/or aircraft retrieval.

Other components shown in FIG. 7 can be varied from the illustrative examples shown. Generally, the different embodiments can be implemented using any hardware device or system capable of running program code.

FIG. 8 is a flowchart of method 800 related to training a machine learning algorithm to control an aircraft, according to example embodiments. Method 800 can be executed by a computing device, such as computing device 700 described in the context of FIG. 7.

Method 800 can begin at block 810 of FIG. 8, where the computing device can train a machine learning algorithm to control a first aircraft in an environment that includes the first aircraft and a second aircraft by: determining a first-aircraft action for the first aircraft to take within the environment using the machine learning algorithm; sending the first-aircraft action from the machine learning algorithm; after sending the first-aircraft action, receiving an observation of the environment and a reward signal at the machine learning algorithm, where the observation of the environment includes information about the environment after the first aircraft has taken the first-aircraft action and the second aircraft has taken a second-aircraft action, and where the reward signal indicates a score of performance of the first-aircraft action by the first aircraft based on one or more dynamic and kinematic properties of the second aircraft within the environment; and updating the machine learning algorithm based on the observation of the environment and the reward signal, such as discussed herein in the context at least of FIGS. 1 and 3.

In some examples, receiving the observation of the environment can include receiving the observation of the environment from a simulator simulating interactions between the first and second aircraft in the environment, such as discussed herein in the context at least of FIGS. 1, 3, and 4.

In some examples, receiving the observation of the environment from the simulator can include receiving the observation of the environment from a simulator that: receives actions from both the first and second aircraft; determines a state of the environment based on the received actions; and determines the information about the environment after the first and second aircraft have taken subsequent actions based on the state of the environment such as discussed herein in the context at least of FIGS. 1, 3, and 4.

In some examples, receiving the observation of the environment can include receiving an observation of the environment that is based on data obtained from one or more sensors of a non-simulated aircraft, such as discussed herein in the context at least of FIG. 1.

In some examples, receiving the observation of the environment and the reward signal can include receiving a reward signal that is based on one or more of: a location of the second aircraft within the environment, a velocity of the second aircraft, an acceleration of the second aircraft, a position of the second aircraft relative to the first aircraft, and a distance between the first and second aircraft, such as discussed herein in the context at least of FIG. 1.

In some examples, the machine learning algorithm can be associated with one or more weights, and training the machine learning algorithm to control the first aircraft can include training the machine learning algorithm in parallel using a plurality of worker threads, each worker thread configured to utilize the machine learning algorithm during training, and where updating the machine learning algorithm based on the observation of the environment and the reward signal can include: storing one or more observations of the environment and one or more reward signals in a trajectory vector using a particular worker thread of the plurality of worker threads; sending the trajectory vector from the particular worker thread to a learner thread associated with the plurality of worker threads; updating the one or more weights of the machine learning algorithm based on the trajectory vector using the learner thread; and updating the machine learning algorithm to utilize the updated one or more weights using the learner thread, such as discussed herein in the context at least of FIGS. 1-4.

In some examples, storing the one or more observations of the environment and the one or more reward signals in the trajectory vector can include storing a plurality of observations of the environment and a plurality of reward signals obtained over a plurality of episodes of interactions between the first and second aircraft within the environment in the trajectory vector using the particular worker thread, where an episode of interactions between the first and second aircraft within the environment of the plurality of episodes of interactions is associated with a predetermined amount of time, such as discussed herein in the context at least of FIG. 4.

In some examples, storing the plurality of observations of the environment and the plurality of reward signals obtained over the plurality of episodes of interactions between the first and second aircraft within the environment in the trajectory vector using the particular worker thread can include storing a plurality of observations of the environment and a plurality of reward signals obtained over an epoch of interactions between the first and second aircraft within the environment, where the epoch of interactions between the first and second aircraft within the environment can include a predetermined number of episodes of interactions between the first and second aircraft within the environment, such as discussed herein in the context at least of FIG. 4.

In some examples, determining the first-aircraft action for the first aircraft within the environment using the machine learning algorithm can include: transforming a coordinate-related input to the machine learning algorithm using a coordinate transformation that transforms coordinates into a proper subset of coordinates possible in the coordinate-related input resulting in a transformed coordinated-related input; and providing the transformed coordinated-related input to the machine learning algorithm, such as discussed herein in the context at least of FIG. 1.

In some examples, receiving the observation of the environment and the reward signal can include receiving a reward signal that is based on a first reward for reducing distance between the first aircraft and the second aircraft, a second reward for the first aircraft reaching a desired location with respect to the second aircraft, or both the first reward and the second reward, such as discussed herein in the context at least of FIG. 1.

In some examples, training the machine learning algorithm to control the first aircraft can include: training the machine learning algorithm to control the first aircraft using a plurality of scenarios related to interactions between the first and second aircraft within the environment, where the plurality of scenarios are arranged so that a first scenario precedes a second scenario in the plurality of scenarios, the first scenario involving a first range of options to control the first aircraft, the second scenario involving a second range of options to control the first aircraft, and where the second range of options can include more options than the first range of options, such as discussed herein in the context at least of FIG. 1.

In some examples, method 800 can further include: after training the machine learning algorithm, using the trained machine learning algorithm to control a non-simulated aircraft, such as discussed herein in the context at least of FIG. 1.

In some examples, using the trained machine learning algorithm to control the non-simulated aircraft can include using the trained machine learning algorithm to control the non-simulated aircraft using one or more control systems of the non-simulated aircraft, such as discussed herein in the context at least of FIG. 1.

In some examples, training the machine learning algorithm further can include: training the machine learning algorithm for a first training session; after training the machine learning algorithm for the first training session, saving the machine learning algorithm as a previous version of the machine learning algorithm; and after saving the previous version of the machine learning algorithm, continuing training of the machine learning algorithm for a second training session, where the machine learning algorithm determines actions for the first aircraft to take within the environment during the second training session, and where the previous version of the machine learning algorithm determines actions for the second aircraft to take within the environment during the second training session, such as discussed herein in the context at least of FIG. 6.

The novel features believed characteristic of the illustrative embodiments are set forth in the appended claims. The illustrative embodiments, however, as well as a preferred mode of use, further objectives and descriptions thereof, will best be understood by reference to the present specification when read in conjunction with the accompanying drawings in which some, but not all of the disclosed embodiments may be shown.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in the disclosed flowcharts may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method, comprising:
  training a machine learning algorithm to control a first aircraft in an environment that comprises the first aircraft and a second aircraft by:
    determining a first-aircraft action for the first aircraft to take within the environment using the machine learning algorithm;
    sending the first-aircraft action from the machine learning algorithm;
    after sending the first-aircraft action, receiving an observation of the environment and a reward signal at the machine learning algorithm, wherein the observation of the environment comprises information about the environment after the first aircraft has taken the first-aircraft action and the second aircraft has taken a second-aircraft action, and wherein the reward signal indicates a score of performance of the first-aircraft action by the first aircraft based on one or more dynamic and kinematic properties of the second aircraft within the environment; and
    updating the machine learning algorithm based on the observation of the environment and the reward signal.

2. The method of claim 1, wherein receiving the observation of the environment comprises receiving the observation of the environment from a simulator simulating interactions between the first and second aircraft in the environment.

3. The method of claim 2, wherein receiving the observation of the environment from the simulator comprises receiving the observation of the environment from a simulator that:

receives actions from both the first and second aircraft;
determines a state of the environment based on the received actions; and
determines the information about the environment after the first and second aircraft have taken subsequent actions based on the state of the environment.

4. The method of claim 1, wherein receiving the observation of the environment comprises receiving an observation of the environment that is based on data obtained from one or more sensors of a non-simulated aircraft.

5. The method of claim 1, wherein receiving the observation of the environment and the reward signal comprises receiving a reward signal that is based on one or more of: a location of the second aircraft within the environment, a velocity of the second aircraft, an acceleration of the second aircraft, a position of the second aircraft relative to the first aircraft, and a distance between the first and second aircraft.

6. The method of claim 1, wherein the machine learning algorithm is associated with one or more weights,
wherein training the machine learning algorithm to control the first aircraft comprises training the machine learning algorithm in parallel using a plurality of worker threads, each worker thread configured to utilize the machine learning algorithm during training, and
wherein updating the machine learning algorithm based on the observation of the environment and the reward signal comprises:
storing one or more observations of the environment and one or more reward signals in a trajectory vector using a particular worker thread of the plurality of worker threads;
sending the trajectory vector from the particular worker thread to a learner thread associated with the plurality of worker threads;
updating the one or more weights of the machine learning algorithm based on the trajectory vector using the learner thread; and
updating the machine learning algorithm to utilize the updated one or more weights using the learner thread.

7. The method of claim 6, wherein storing the one or more observations of the environment and the one or more reward signals in the trajectory vector comprises storing a plurality of observations of the environment and a plurality of reward signals obtained over a plurality of episodes of interactions between the first and second aircraft within the environment in the trajectory vector using the particular worker thread, wherein an episode of interactions between the first and second aircraft within the environment of the plurality of episodes of interactions is associated with a predetermined amount of time.

8. The method of claim 7, wherein storing the plurality of observations of the environment and the plurality of reward signals obtained over the plurality of episodes of interactions between the first and second aircraft within the environment in the trajectory vector using the particular worker thread comprises storing a plurality of observations of the environment and a plurality of reward signals obtained over an epoch of interactions between the first and second aircraft within the environment, wherein the epoch of interactions between the first and second aircraft within the environment comprises a predetermined number of episodes of interactions between the first and second aircraft within the environment.

9. The method of claim 1, wherein determining the first-aircraft action for the first aircraft within the environment using the machine learning algorithm comprises:
transforming a coordinate-related input to the machine learning algorithm using a coordinate transformation that transforms coordinates into a proper subset of coordinates possible in the coordinate-related input resulting in a transformed coordinated-related input; and
providing the transformed coordinated-related input to the machine learning algorithm.

10. The method of claim 1, wherein receiving the observation of the environment and the reward signal comprises receiving a reward signal that is based on a first reward for reducing distance between the first aircraft and the second aircraft, a second reward for the first aircraft reaching a desired location with respect to the second aircraft, or both the first reward and the second reward.

11. The method of claim 1, wherein training the machine learning algorithm to control the first aircraft comprises:
training the machine learning algorithm to control the first aircraft using a plurality of scenarios related to interactions between the first and second aircraft within the environment, wherein the plurality of scenarios are arranged so that a first scenario precedes a second scenario in the plurality of scenarios, the first scenario involving a first range of options to control the first aircraft, the second scenario involving a second range of options to control the first aircraft, and wherein the second range of options includes more options than the first range of options.

12. The method of claim 1, further comprising:
after training the machine learning algorithm, using the trained machine learning algorithm to control a non-simulated aircraft.

13. The method of claim 12, wherein using the trained machine learning algorithm to control the non-simulated aircraft comprises using the trained machine learning algorithm to control the non-simulated aircraft using one or more control systems of the non-simulated aircraft.

14. The method of claim 1, wherein training the machine learning algorithm further comprises:
training the machine learning algorithm for a first training session;
after training the machine learning algorithm for the first training session, saving the machine learning algorithm as a previous version of the machine learning algorithm; and
after saving the previous version of the machine learning algorithm, continuing training of the machine learning algorithm for a second training session, wherein the machine learning algorithm determines actions for the first aircraft to take within the environment during the second training session, and wherein the previous version of the machine learning algorithm determines actions for the second aircraft to take within the environment during the second training session.

15. A computing device, comprising:
one or more processors; and
data storage storing at least executable instructions that, when executed by the one or more processors, cause the computing device to perform functions comprising:
training a machine learning algorithm to control a first aircraft in an environment that comprises the first aircraft and a second aircraft by:

determining a first-aircraft action for the first aircraft to take within the environment using the machine learning algorithm;

sending the first-aircraft action from the machine learning algorithm;

after sending the first-aircraft action, receiving an observation of the environment and a reward signal at the machine learning algorithm, wherein the observation of the environment comprises information about the environment after the first aircraft has taken the first-aircraft action and the second aircraft has taken a second-aircraft action, and wherein the reward signal indicates a score of performance of the first-aircraft action by the first aircraft based on one or more dynamic and kinematic properties of the second aircraft within the environment; and updating the machine learning algorithm based on the observation of the environment and the reward signal.

16. The computing device of claim 15, wherein receiving the observation of the environment comprises receiving the observation of the environment from a simulator simulating interactions between the first and second aircraft in the environment.

17. The computing device of claim 15, wherein receiving the observation of the environment comprises receiving an observation of the environment that is based on data obtained from one or more sensors of a non-simulated aircraft.

18. The computing device of claim 15, wherein the machine learning algorithm is associated with one or more weights, wherein the computing device comprises a plurality of worker threads, each worker thread configured to utilize the machine learning algorithm during training, and a learner thread associated with the plurality of worker threads, wherein training the machine learning algorithm to control the first aircraft comprises training the machine learning algorithm in parallel using the plurality of worker threads, and wherein updating the machine learning algorithm based on the observation of the environment and the reward signal comprises:

storing one or more observations of the environment and one or more reward signals in a trajectory vector using a particular worker thread of the plurality of worker threads;

sending the trajectory vector from the particular worker thread to the learner thread;

updating the one or more weights of the machine learning algorithm based on the trajectory vector using the learner thread; and updating the machine learning algorithm to utilize the updated one or more weights using the learner thread.

19. The computing device of claim 18, wherein storing the one or more observations of the environment and the one or more reward signals in the trajectory vector comprises storing a plurality of observations of the environment and a plurality of reward signals obtained over a plurality of episodes of interactions between the first and second aircraft within the environment in the trajectory vector using the particular worker thread, wherein an episode of interactions between the first and second aircraft within the environment of the plurality of episodes of interactions is associated with a predetermined amount of time.

20. A non-transitory computer readable medium that stores at least executable instructions that, when executed by one or more processors of a computing device, cause the computing device to perform functions comprising:

training a machine learning algorithm to control a first aircraft in an environment that comprises the first aircraft and a second aircraft by:

determining a first-aircraft action for the first aircraft to take within the environment using the machine learning algorithm;

sending the first-aircraft action from the machine learning algorithm;

after sending the first-aircraft action, receiving an observation of the environment and a reward signal at the machine learning algorithm, wherein the observation of the environment comprises information about the environment after the first aircraft has taken the first-aircraft action and the second aircraft has taken a second-aircraft action, and wherein the reward signal indicates a score of performance of the first-aircraft action by the first aircraft based on one or more dynamic and kinematic properties of the second aircraft within the environment; and updating the machine learning algorithm based on the observation of the environment and the reward signal.

* * * * *